(12) United States Patent
Chiu

(10) Patent No.: US 7,469,411 B2
(45) Date of Patent: Dec. 23, 2008

(54) DISC ACCESSING APPARATUS AND THE PANEL THEREOF

(75) Inventor: Yi-Ling Chiu, Kaohsiung (TW)

(73) Assignees: Benq Corporation, Taoyuan (TW); Qisda Corporation, Taoyuan (TW)

( * ) Notice: Subject to any disclaimer, the term of this patent is extended or adjusted under 35 U.S.C. 154(b) by 424 days.

(21) Appl. No.: 11/022,470

(22) Filed: Dec. 23, 2004

(65) Prior Publication Data

US 2005/0144625 A1 Jun. 30, 2005

(30) Foreign Application Priority Data

Dec. 29, 2003 (TW) .............................. 92222846 U

(51) Int. Cl.
*G11B 33/02* (2006.01)
(52) U.S. Cl. ...................................... 720/601
(58) Field of Classification Search ................ 720/646, 720/647, 601; 360/99.06, 137, 97.02, 99.02; 361/685
See application file for complete search history.

(56) References Cited

U.S. PATENT DOCUMENTS

| | | | | |
|---|---|---|---|---|
| 4,691,257 A * | 9/1987 | Taguchi | .................. | 360/97.02 |
| 5,351,228 A * | 9/1994 | Kanno et al. | ................. | 720/647 |
| 5,648,882 A * | 7/1997 | Tangi et al. | .............. | 360/99.06 |
| 5,748,595 A * | 5/1998 | Nakajima | .................... | 720/647 |
| 5,787,063 A * | 7/1998 | Kanno et al. | ................. | 720/647 |
| 5,940,245 A * | 8/1999 | Sasaki et al. | ............. | 360/99.06 |
| 5,978,339 A * | 11/1999 | Sasaki et al. | ................. | 720/646 |
| 6,392,839 B2 * | 5/2002 | Jitsukäwa | ................ | 360/99.06 |
| 7,069,563 B2 * | 6/2006 | Huang et al. | ................. | 720/601 |
| 2004/0172641 A1* | 9/2004 | Saito | .......................... | 720/646 |

* cited by examiner

*Primary Examiner*—Tianjie Chen
(74) *Attorney, Agent, or Firm*—Snell & Wilmer L.L.P.

(57) ABSTRACT

A disc accessing apparatus and its panel are provided. The disc accessing apparatus includes a housing, a panel with an opening for a disc to pass, a surface slanted towards the opening and an engagement portion. When a disc cannot be ejected from the disc accessing apparatus normally, the surface leads the disc out. In case the disc cracks into pieces during high-speed rotation, the pieces strike the surface to generate a force that makes the engagement portion and the housing engage more tightly.

11 Claims, 4 Drawing Sheets

DISC ACCESSING APPARATUS AND THE PANEL THEREOF

This Application claims the right of priority based on Taiwan Patent Application No. 092222846 filed on Dec. 29, 2003.

FIELD OF THE INVENTION

The present invention generally relates to a disc accessing apparatus and the panel thereof. More particularly, the present invention relates to a CD-ROM apparatus that is able to prevent a disc from being jammed in the CD-ROM apparatus or a cracked disc from jetting out of the CD-ROM apparatus.

BACKGROUND OF THE INVENTION

Conventionally, in order to meet the particular requirements of the system assembly, CD-ROMs might need to be installed vertically. Take tray-based CD-ROM assemblies as an example; at least one protrusion is disposed adjacent to a disc receiver of a tray to locate a disc. The space between the protrusion and the disc receiver is larger than the thickness of the disc so that users can easily take the disc off the disc receiver.

Referring to FIG. 1, as the disc 140 is ejected, vibration or other problems of the disc accessing apparatus 10 would easily make the disc 140 slanted, even strike the panel 100, and thus the disc 140 is jammed between the panel 100 and the housing 150. This may generate problems including such as the disc 140 may be scraped so seriously that the data thereon becomes inaccessible, and that the disc accessing apparatus 10 may even be broken.

In addition, due to the increase in rotation speed of CD-ROMs and the uneven quality of discs on the market nowadays, injuries caused by cracked discs that fly out of the running CD-ROM assemblies happen from time to time. Conventionally, the front edge of the housing is bent downward to block the cracked disc. However, the energy generated while the disc cracks usually warps the housing, and then the pieces of cracked disc are able to pass from the underside of the front edge of the housing.

SUMMARY OF THE INVENTION

The present invention introduces a disc accessing apparatus and the panel thereof to improve the foregoing drawbacks.

One aspect of the present invention is to provide a disc accessing apparatus and the panel thereof. As a disc cannot be ejected from the disc accessing apparatus normally, a surface facilitates ejection of the disc.

Another aspect of the present invention is to provide a disc accessing apparatus and the panel thereof. When a disc cracks into pieces during high-speed rotation, the pieces strike the surface and cause an engagement portion and a housing to engage more tightly, which prevents the pieces from jetting out of the apparatus.

The disc accessing apparatus of the present invention comprises a housing, a panel and a wedge portion. The panel disposed in front of the housing includes an opening for a disc to pass, a surface slanted towards the opening and an engagement portion. As a disc fails to eject from the disc accessing apparatus normally, the surface facilitates the disc to eject. When a disc cracks into pieces during high-speed rotation, the pieces strike the surface to generate a force that makes the engagement portion and the housing engage more tightly.

BRIEF DESCRIPTION OF THE DRAWINGS

FIG. 2b is a partially enlarged view of FIG. 2a.

DETAILED DESCRIPTION

The present invention provides a disc accessing apparatus and a panel thereof for guiding a disc out normally. In case the disc cracks into pieces during high-speed rotation, the panel also prevents the pieces of a cracked disc from jetting out of the disc accessing apparatus.

Figure 1:
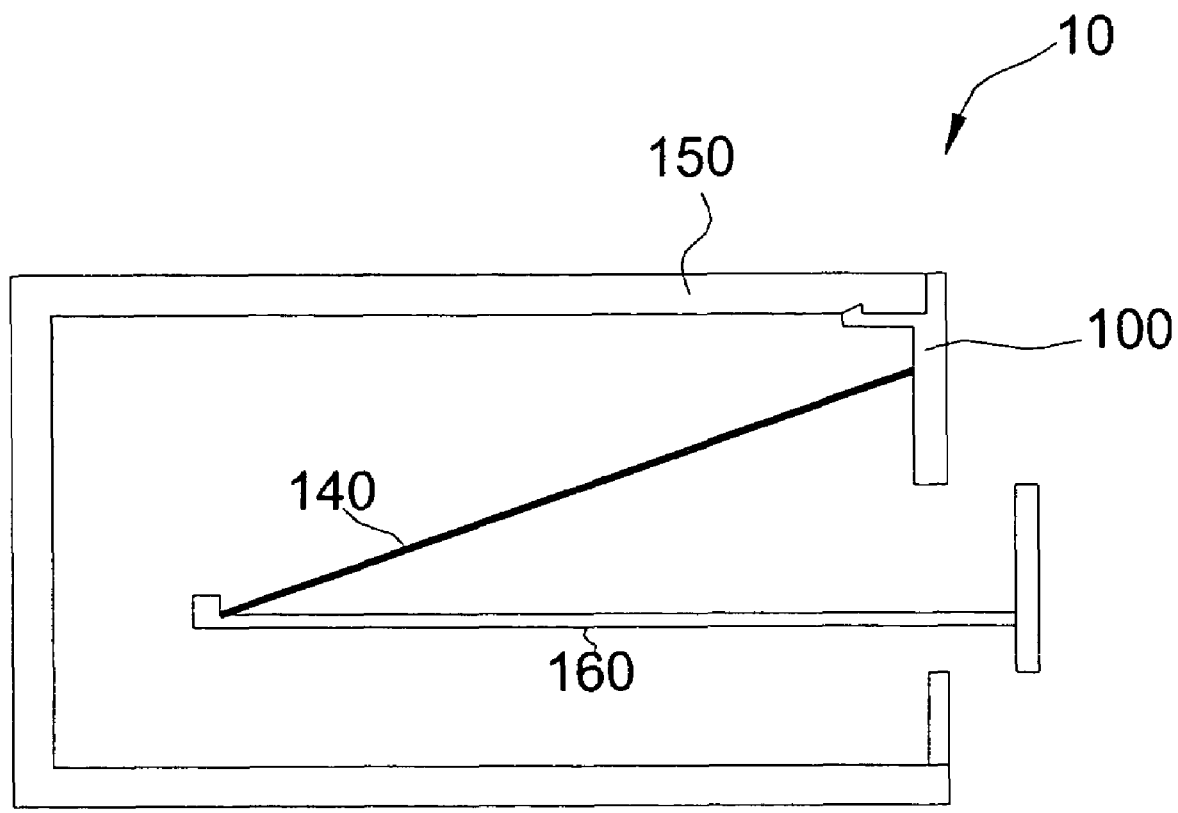
FIG. 1 is a cross-section view to illustrate the slanted disc jammed in the disc accessing apparatus of the prior art.
Figure 2A:
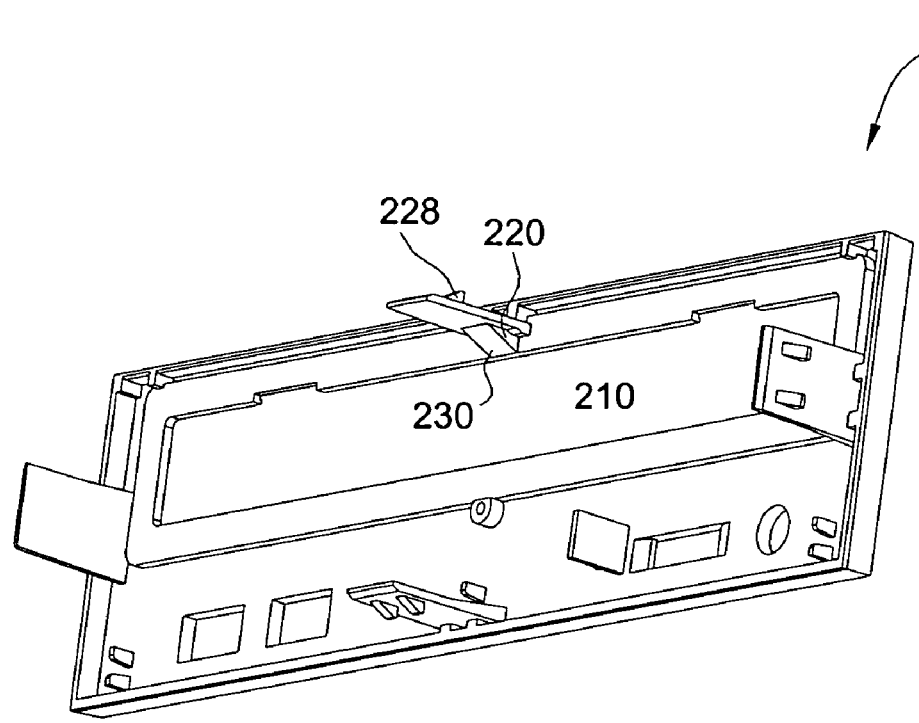
FIG. 2a is a rear perspective view of the panel of the present invention.
Figure 2B:
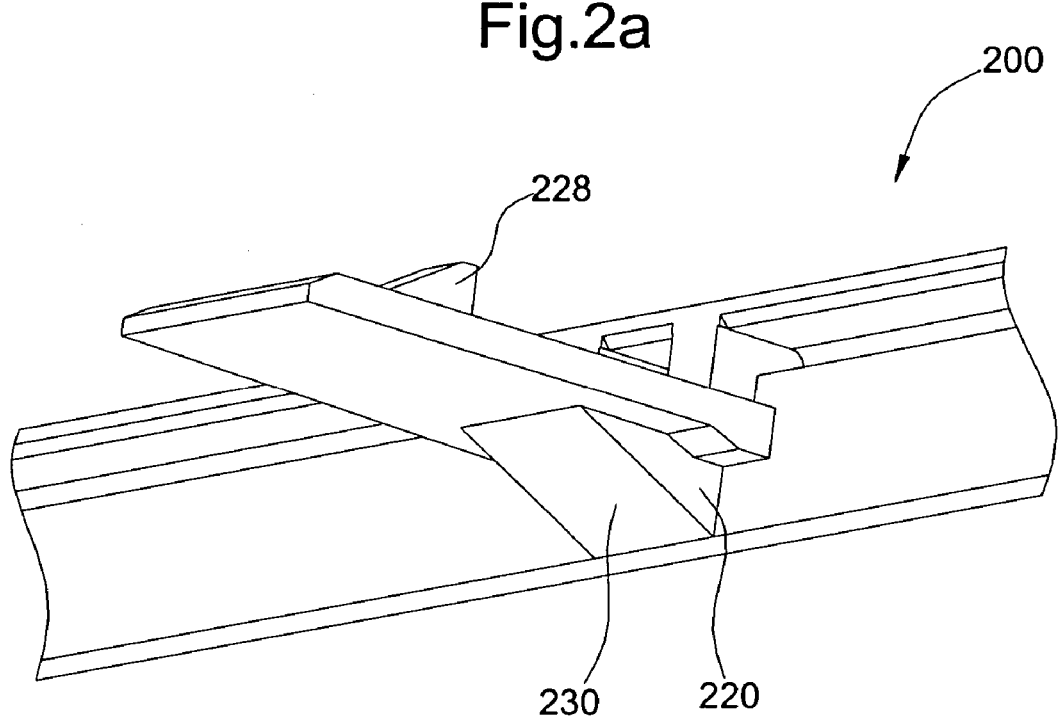

In accordance with a panel of an embodiment of the present invention, as shown in FIG. 2a and FIG. 2b, the panel 200 includes an opening 210, a wedge portion 220 and an engagement portion 228. The opening 210 allows a disc 140 (shown in FIG. 3) to pass. The engagement portion 228 here mentioned is a latch, which is used to engage the panel 200 with a housing 250 (shown in FIG. 3) of the disc accessing apparatus 30 (shown in FIG. 3). The wedge portion 220, placed near the opening 210, provides a surface 230 slanted towards the opening 210. In this embodiment, the wedge portion 220 and the panel 200 are formed integrally. For example, the panel 200 extends inwardly to form the surface 230.

Figure 3:
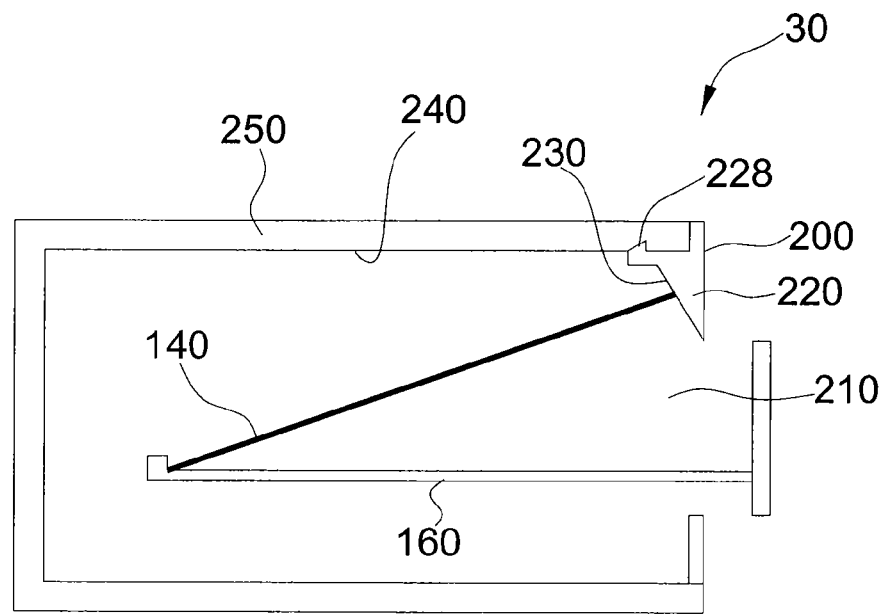
FIG. 3 is a cross-section view to illustrate the slanted disc guided to release from the disc accessing apparatus of the embodiment.

FIG. 3 shows the cross-section of the disc accessing apparatus of the present invention. The disc accessing apparatus 30 mentioned here is tray-based disc accessing apparatus, suitable for use with, for example, a CD/DVD-ROM, a CD-R/RW, or a DVD+-R/RW. Those mentioned above of slot-in-based disc accessing apparatus are resemblances. The disc accessing apparatus 30 comprises the housing 250, the panel 200 and the surface 230. The panel 200 provided on the front side of the housing 250 has the opening 210 allowing the disc 140 to pass. The wedge portion 220 placed near the opening 210 provides the surface 230 slanted substantially from an inner 240 of the housing 250 towards the opening 210. In this embodiment, the wedge portion 220 and the panel 200 are formed integrally, which is as same as mentioned in FIG. 2a and FIG. 2b.

A disc 140 may be slanted due to vibration or other problems of the disc accessing apparatus 30. As the slanted disc 140 is ejected from the disc accessing apparatus 30, the surface 230 prevents the slanted disc 140 from striking the panel 200 and guides the slanted disc 140 out with the outward movement of the tray 160.

This action prevents the disc 140 from being jammed in the disc accessing apparatus 30. It is noted that people skilled in the art will realize that the surface 230 is a representative embodiment; other equivalents, such as a convex surface, can also guide the slanted disc 140 out.

Moreover, the panel 200 engages with the housing 250 by the engagement portion 228 disposed on the wedge portion 220. A disc 140 of low quality may crack into pieces (not shown) during high-speed rotation. The pieces (not shown) strike the surface 230 to generate a force that makes the engagement portion 228 and the housing 250 engage more tightly. Therefore, the relative movement between the panel 200 and housing 250 is limited and the pieces won't fly out of the disc accessing apparatus 30.

Figure 4:
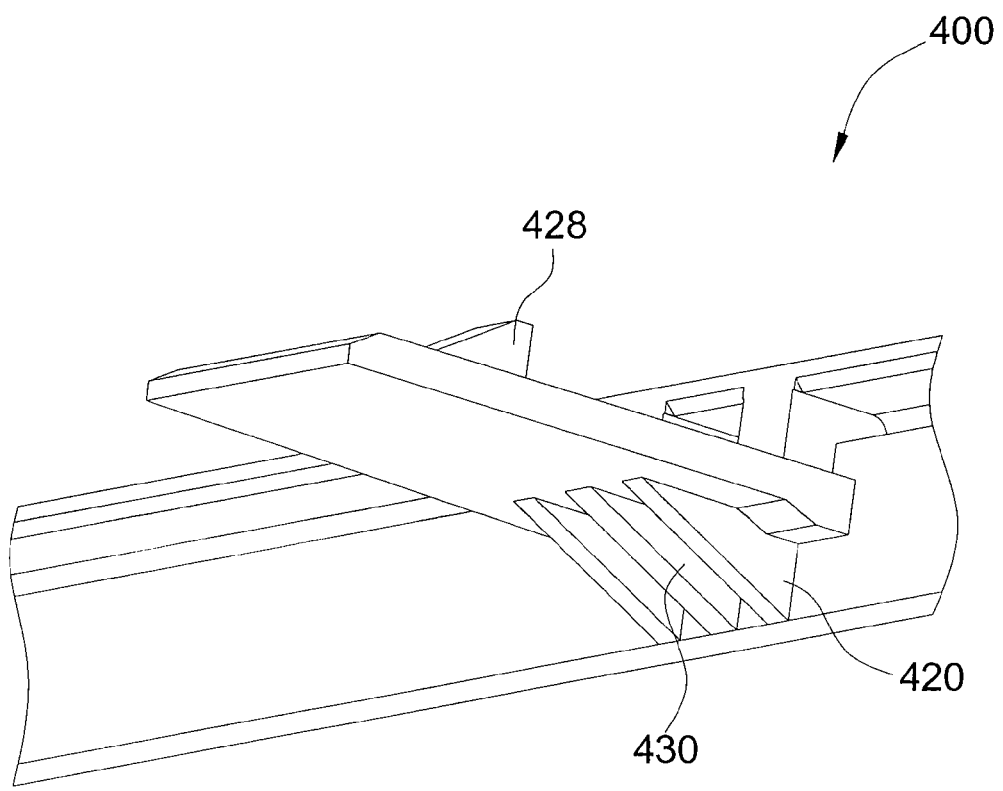
FIG. 4 is a partially enlarged view of the panel of another embodiment.

Referring to FIG. 4, in the preferred embodiment of the present invention, a panel 400 consists of a plurality of wedge portions 420 to form the surface 430. The advantage is that the structure of panel is strengthened to prevent the panel 400 from deforming caused by the variation of the temperature during the manufacturing process.

Figure 5:
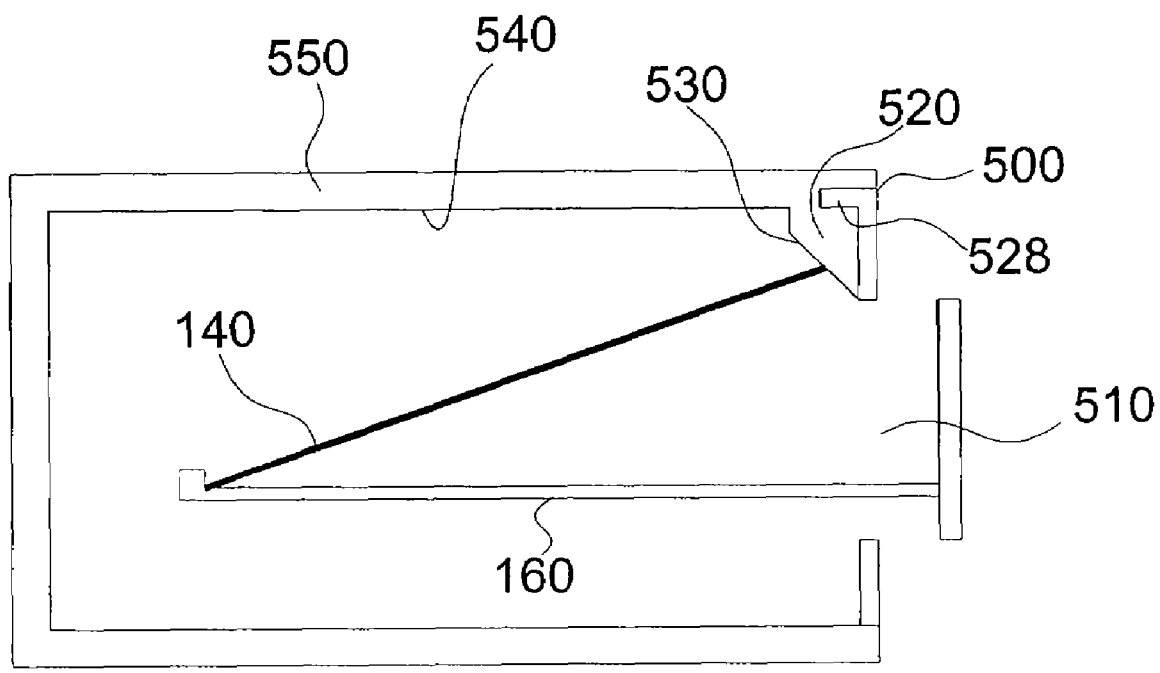
FIG. 5 is a cross-section view to illustrate the slanted disc guided to release from the disc accessing apparatus of another embodiment.

FIG. 5 is the cross-section view of the disc accessing apparatus of another embodiment of the present invention. A wedge portion 520 is extended inwardly from an inner top 540 of the housing 550 for forming a surface 530 towards an opening 510. The engagement portion 528 also can be provided as a recess to engage the panel 500. Other elements present in FIG. 5 are alike those in FIG. 3. People skilled in the art could easily recognize the present invention by the aforementioned description.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is supposed to be covered within the spirit and scope to be protected and that the interpretation of the scope of the subject invention would therefore be interpreted as broadly as possible.

What I claim is:

1. A disc accessing apparatus, comprising:
    a housing;
    a panel with an opening allowing a disc to pass, disposed in the front of the housing; and
    a wedge portion adjacent to an inner top of the housing, including:
        an engagement portion placed on a first side of the wedge portion, for engaging the panel with the housing of the disc accessing apparatus; and
        a surface placed on a second side opposite to the first side of the wedge portion, slanted substantially from the inner top to the opening;
    wherein an angle between the inner top and the slanted surface is greater than 90 degrees and smaller than 180 degrees for facilitating the ejection of the disc.

2. The disc accessing apparatus of claim 1, wherein the surface is placed substantially right below the engagement portion.

3. The disc accessing apparatus of claim 1, wherein the wedge portion and the panel are formed integrally.

4. The disc accessing apparatus of claim 1, wherein the engagement portion is a latch.

5. The disc accessing apparatus of claim 1, wherein the wedge portion and the housing are formed integrally.

6. The disc accessing apparatus of claim 5, wherein the engagement portion is a recess.

7. The disc accessing apparatus of claim 1, wherein the surface is placed inside the housing, and is slanted from a first end of the surface which is substantially as high as the inner top towards a second end of the surface which is substantially as high as the opening.

8. A disc accessing apparatus, comprising:
    a housing; and
    a panel with an opening allowing a disc to pass, disposed in the front of the housing, including:
        an engagement portion for engaging the panel with the housing; and
        a wedge portion coupled between the engagement portion and the opening to provide a surface inside the housing and inclined towards the opening;
    wherein the engagement portion is provided on the wedge portion and opposite to the surface.

9. The disc accessing apparatus of claim 8, wherein the wedge portion and the panel are formed integrally.

10. A disc accessing apparatus, comprising:
    a housing forming a disc receiving space;
    a panel disposed in the front of the housing, having an opening allowing a disc to enter the disc receiving space along a first direction, said panel comprising an upper inner surface above the opening and facing the disc receiving space and comprising an engagement portion for engaging the panel with the housing; and
    a wedge portion disposed above the opening and extending within the disc receiving space, the wedge portion having a bottom surface consisting of:
    a horizontal surface; and
    a slanted surface disposed on the horizontal surface, the slanted surface extending from a peripheral of the opening and along the first direction:
    wherein the wedge portion protrudes from around a central portion of the upper inner surface of the panel and the engagement portion is disposed on an upper surface of the wedge portion.

11. The disc accessing apparatus of claim 10, wherein the wedge portion and the panel are formed integrally.

* * * * *